(12) United States Patent
Leonetti et al.

(10) Patent No.: US 7,841,652 B2
(45) Date of Patent: Nov. 30, 2010

(54) WHEELHOUSE INNER BRACKET FOR AUTOMOTIVE VEHICLES

(75) Inventors: Philip John Leonetti, Northville, MI (US); Ron Allen Carpenter, Grosse Ile, MI (US); Steve William Gallagher, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 133 days.

(21) Appl. No.: 12/324,944

(22) Filed: Nov. 28, 2008

(65) Prior Publication Data

US 2010/0133879 A1    Jun. 3, 2010

(51) Int. Cl.
*B60N 99/00* (2006.01)

(52) U.S. Cl. ..................................................... 296/198

(58) Field of Classification Search ............ 296/193.08, 296/198, 203.04, 203.01, 204, 181.4, 30
See application file for complete search history.

(56) References Cited

U.S. PATENT DOCUMENTS

| | | | |
|---|---|---|---|
| 4,183,574 A * | 1/1980 | Klie et al. .................... | 296/198 |
| 6,648,401 B2 | 11/2003 | Behnke et al. ......... | 296/203.04 |
| 7,021,703 B2 | 4/2006 | Yamaguchi et al. ......... | 296/198 |
| 7,281,756 B2 * | 10/2007 | Fukushi et al. ......... | 296/203.04 |

* cited by examiner

*Primary Examiner*—Lori L Lyjak
(74) *Attorney, Agent, or Firm*—Fredericks Owens, Esq.; Miller Law Group, PLLC

(57) ABSTRACT

A wheelhouse reinforcement bracket provides increased torsional rigidity for the rear wheelhouses of an automotive vehicle. The wheelhouse bracket is positioned in alignment with the location on the vehicle body where the shock absorber is located, and in alignment with the rear suspension cross frame member to create a structural ring formed by the wheelhouse bracket, the C-pillar and the rear suspension cross frame member. The wheelhouse bracket is formed with a mounting flange positionable within the inside of the U-shaped rear side frame rail to facilitate welding thereto instead of being welded to the top of the underbody floor structure. The mounting flange has a first portion configured to be mated against a first generally vertically extending wall of the rear side frame rail and a second portion configured to be mated against a generally horizontally extending wall of the rear side frame rail.

19 Claims, 3 Drawing Sheets

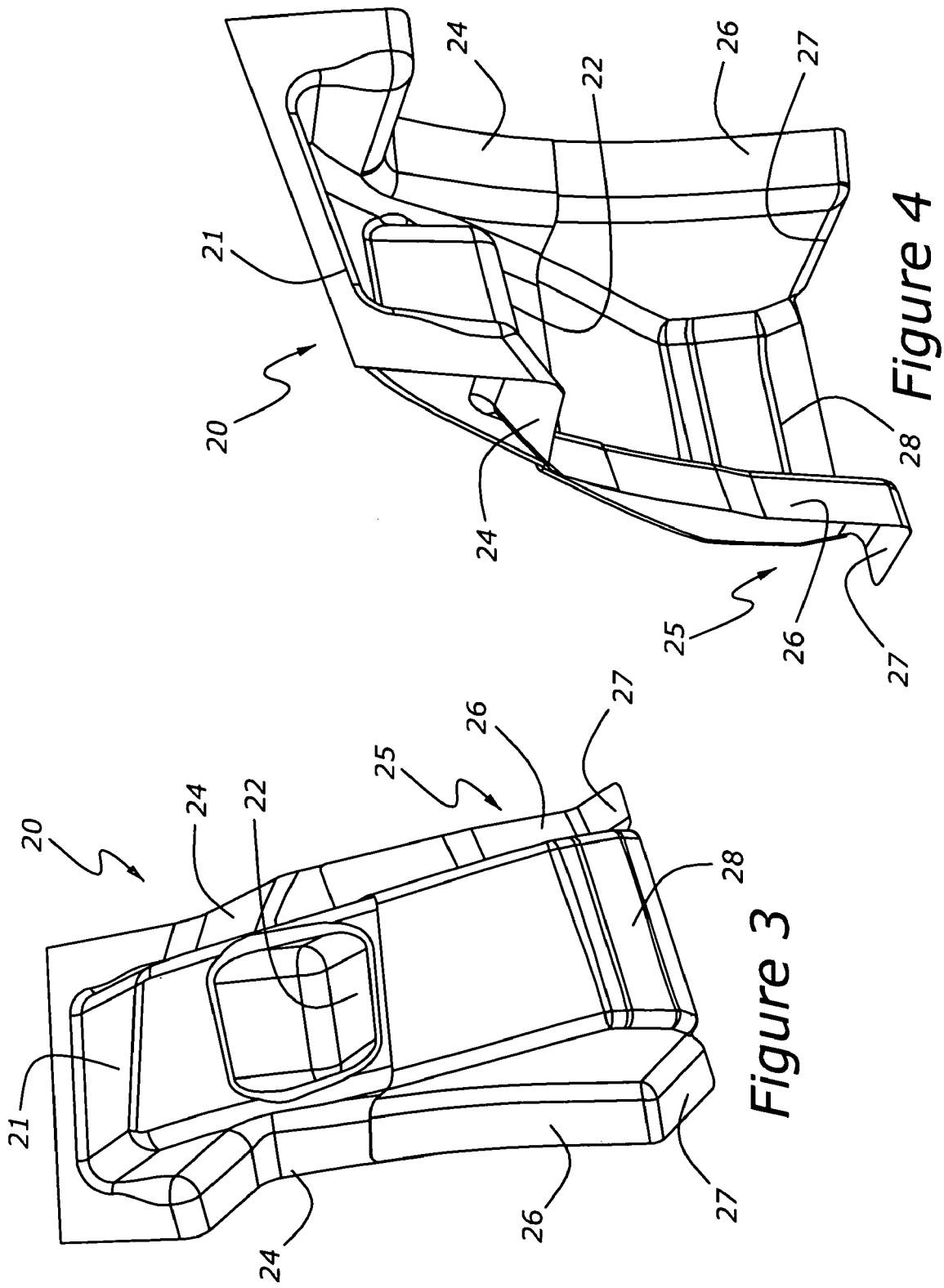

WHEELHOUSE INNER BRACKET FOR AUTOMOTIVE VEHICLES

FIELD OF THE INVENTION

This invention relates to the unitized construction of an automotive vehicle and, more particularly, to a bracket located inside the rear side rail in line with the rear suspension cross member to create superior structural continuity in the rear underbody architecture of an automotive vehicle.

BACKGROUND OF THE INVENTION

An automotive body construction includes an underbody and a wheelhouse at which a reinforcement bracket is typically positioned on top of the floor of the underbody to increase torsional rigidity. This known reinforcement structure for the wheelhouse not located strategically well and does not provide an effective connection into the existing back-up structure in the underbody, which leads to over cost, over weight and ineffective reinforcement design solutions for increasing torsional rigidity.

An example of a known wheelhouse reinforcement structure can be seen in U.S. Pat. No. 7,021,703, issued to Toshiyuki Yamaguchi, et al, on Apr. 4, 2006. This prior art patent discloses left and right floor rear side rails extending in a longitudinal direction (i.e. front to rear with respect to the automotive vehicle) and a rear suspension cross member connected between the left and right floor rear side rails. The underbody floor is mounted on the rear side rails and the underbody cross members. Left and right damper support members are mounted to the underbody floor adjacent to the respective floor rear side rails for supporting upper end portions of the damper support member in a transverse direction, and mounted to the underbody floor and the corresponding floor rear side rails for covering upper parts of the left and right rear wheels. Left and right gussets are connected to a reinforcement plate, a respective wheelhouse, a respective damper support member and underbody cross member.

In U.S. Pat. No. 6,648,401, issued to Guenter Behnke and Thomas Doerfler and assigned to Ford Global Technologies, LLC, on Nov. 18, 2003, a reinforcement member is disclosed as being fastened to a longitudinal member in a region of a junction between the longitudinal member and underbody cross member. This reinforcement member results in a particularly rigid connecting node formed by the underbody cross member, the longitudinal rear side rail members and the wheelhouse. The reinforcement member provides an additional path to transfer forces from the wheelhouse into the longitudinal rear side rail member.

It would be desirable to provide a reinforcement bracket located inside the rear side rail in alignment with the shock and the underbody cross member to create superior structural continuity in the rear underbody architecture.

SUMMARY OF THE INVENTION

It is an object of this invention to overcome the aforementioned disadvantages of the known prior art by providing a reinforcement bracket located inside the rear side rail in alignment with the shock and the underbody cross member to create superior structural continuity in the rear underbody architecture.

It is another object of this invention to position the reinforcement bracket in alignment with the C-pillar and the roof header body structure.

It is an advantage of this invention that when aligned with the C-pillar and the roof header body structure, the reinforcement bracket creates a structural ring that results in a lighter weight structure having a better NVH & Durability vehicle performance.

It is a feature of this invention that the reinforcement bracket is located on the inside of the rear side rail.

It is another feature of this invention that the reinforcement bracket is located inline with the location on the vehicle body where the shock absorber is attached, and inline with the rear suspension cross member.

It is another advantage of this invention that the reinforcement bracket creates a superior structural continuity in the rear underbody architecture of the automotive vehicle.

It is still another advantage of this invention that the reinforcement bracket provides improvements in static & dynamic body stiffness plus improvements in rough road NVH vehicle performance.

It is still another object of this invention to provide a wheelhouse reinforcement bracket that is connected on the interior side of a U-shaped rear side rail while being strategically aligned between the shock attachment location and the rear suspension cross member.

It is yet another object of this invention to provide a wheelhouse reinforcement bracket for an automotive vehicle that is durable in construction, inexpensive of manufacture, carefree of maintenance, facile in assemblage, and simple and effective in use.

These and other objects, features and advantages are accomplished according to the instant invention by providing a wheelhouse reinforcement bracket for the rear wheelhouses of an automotive vehicle to increase torsional rigidity for the vehicle. The wheelhouse bracket is positioned in alignment with the location on the vehicle body where the shock absorber is located, and in alignment with the rear suspension cross member to create a structural ring formed by the wheelhouse bracket, the C-pillar and the rear suspension cross member. The wheelhouse bracket is formed with a mounting flange positionable within the inside of the U-shaped rear side rail to facilitate welding thereto instead of being welded to the top of the underbody floor structure. The mounting flange has a first portion configured to be mated against a first generally vertically extending wall of the rear side rail and a second portion configured to be mated against a generally horizontally extending wall of the rear side rail.

BRIEF DESCRIPTION OF THE DRAWINGS

The advantages of this invention will become apparent upon consideration of the following detailed disclosure of the invention, especially when taken in conjunction with the accompanying drawings wherein:

FIG. 3 is an outer perspective view of the wheelhouse bracket incorporating the principles of the instant invention depicting the interior side of the wheelhouse bracket when affixed to the wheelhouse structure; and FIG. 4 is an interior perspective view of the wheelhouse bracket showing the details of the configuration thereof, this interior perspective view being hidden against the wheelhouse structure when affixed thereto.

DETAILED DESCRIPTION OF THE PREFERRED EMBODIMENT

Figure 1:
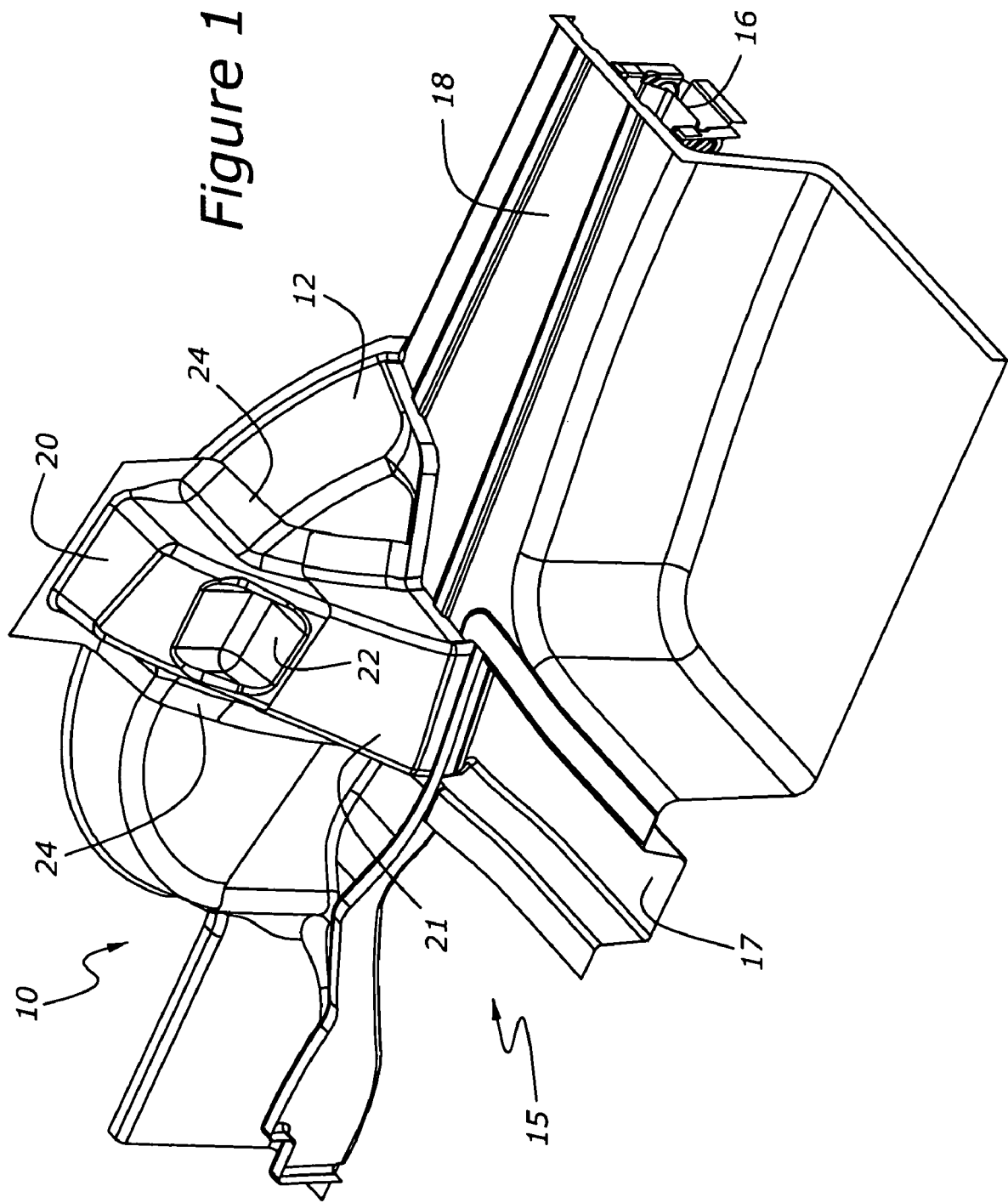
FIG. 1 is a partial interior side perspective view of the rear wheelhouse of an automotive vehicle showing the wheelhouse bracket incorporating the principles of the instant invention, a portion of the rear side rail, the wheelhouse, a portion of the underbody cross member and a portion of the underbody floor structure that extends over top of the rear side rail.
Figure 2:
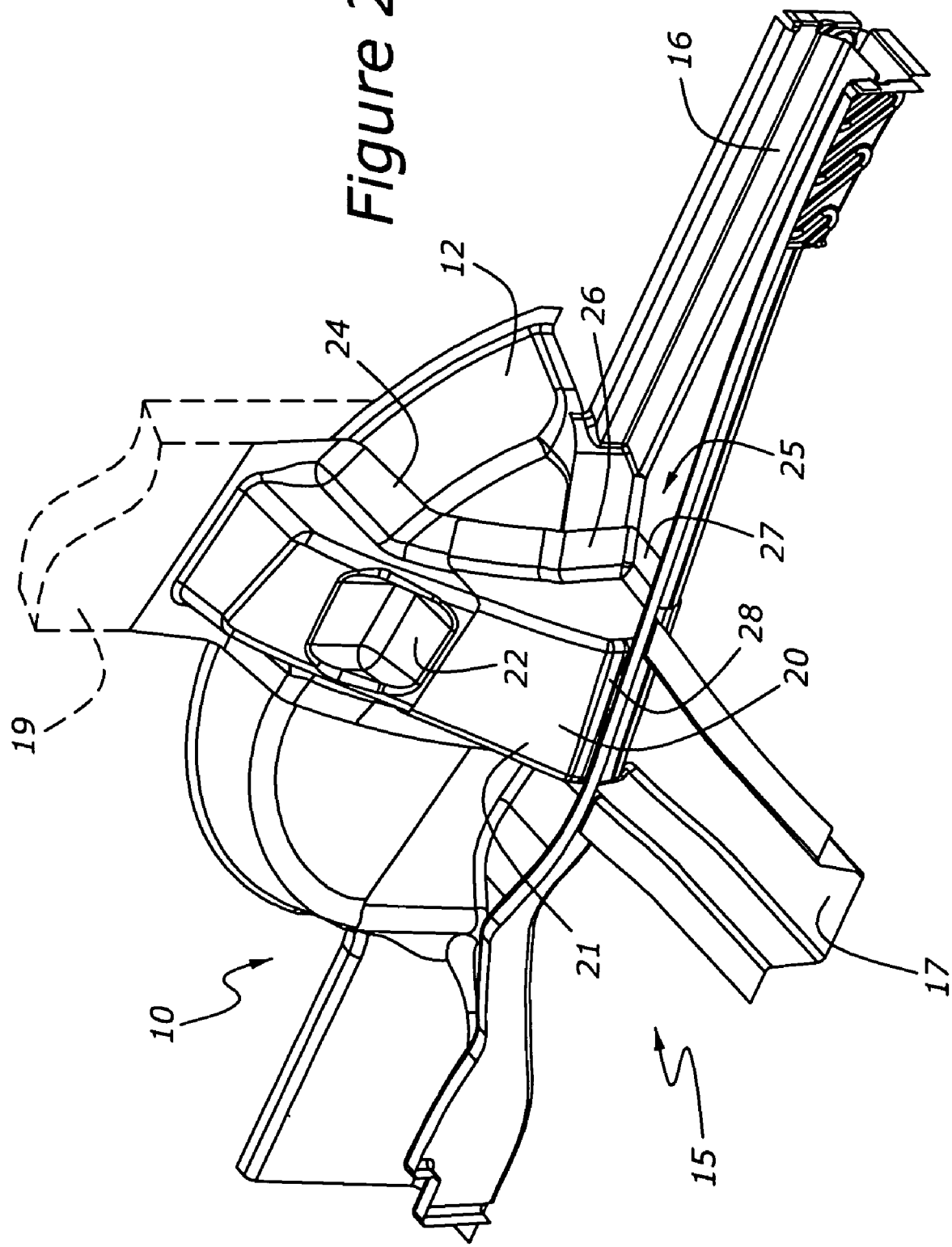
FIG. 2 is a partial interior side perspective view of the rear wheelhouse area shown in FIG. 1, but having the underbody floor structure broken away to reveal the engagement of the wheelhouse bracket with the inner portion of the rear side rail while being in alignment with the location on the body where the shock absorber is mounted and in alignment with the underbody cross member and the C-pillar of the automotive vehicle structure.

Referring to the drawings, a wheelhouse bracket incorporating the principles of the instant invention can best be seen. The wheelhouse bracket 20 is welded to each of the wheelhouse structures 12 of an automotive vehicle 10, a representative one of which is partially shown in FIGS. 1 and 2. The wheelhouse structure 12 is a curved member that provides space for the mounting of one of the wheels (not shown) of an automobile 10 so that the wheel is positioned within the transversely extending structure of the vehicle 10. As is well known in the automotive arts, the wheel has associated therewith a suspension mechanism (not shown) which includes a shock absorber (not shown) that is connected to the body of the vehicle to allow movement of the wheel relative to the vehicle body while moving over the ground surface.

The conventional unitized construction structure 15 of the automotive vehicle 10 includes a longitudinally extending rear side rail 16 on each opposing transverse side of the vehicle 10 to which is welded a transversely extending rear suspension cross member 17 that extends therebetween. Each of these members 16, 17 can be formed from sheet metal into a generally U-shaped configuration to provide frame support for the vehicle 10. The rear underbody structure 15 also conventionally includes an underbody floor structure 18 that is mounted on top of the rear side rail 16 and often the cross member 17, depending on the configuration of the automobile 10. The rear underbody structure 15 also includes a pair of generally vertically oriented C-pillar frame members 19 that interconnects the rear side rails 16 with the roof header frame members (not shown) as is well known in the automotive arts.

In known existing wheelhouse structures 12, as is represented in the aforementioned U.S. Pat. No. 7,021,703, a wheelhouse bracket is provided on the wheelhouse 12 in alignment with the location at which the shock absorber (not shown) is mounted to the vehicle body and over top of the rear side rail 16, welded to the underbody floor structure 18. However, such a configuration of the wheelhouse bracket is ineffective as the wheelhouse bracket is not strategically well placed or tied into the existing backup structure of the automotive rear structure 15. Because of these inefficiencies, the wheelhouse bracket needs to be larger, resulting in increased weight, increased space and increased costs.

The wheelhouse bracket 20 incorporating the principles of the instant invention is not affixed to the underbody floor structure 18, as is known in the art. The instant wheelhouse bracket 20 is formed with body portion 21 is configured to extend generally vertically over the wheelhouse structure 12 and a mounting flange 25 that is configured to extend into the interior of the rear side rail 16 so as to be welded to the inner portions of the rear side rail 16 and become integrated into the rear structure 15 of the vehicle 10. The wheelhouse bracket 20 is aligned directly with the rear suspension cross member 17, which in turn is welded to the rear side rail 16, and thus to the wheelhouse bracket 20. The wheelhouse bracket 20 is also oriented in alignment with the C-pillar frame member 19 to create a vertically oriented structural ring that includes the roof header structure (not shown), the C-pillar 19, and the cross member 17 to provide increased resistance to torsion.

The mounting flange 25 is formed with a generally vertical, longitudinally extending portion 26 on both sides thereof to allow the wheelhouse bracket 20 to be welded to the inside vertically extending side wall of the rear side rail 16. The mounting flange 25 also includes a horizontal portion 27 on opposing sides of the wheelhouse bracket 20 to permit the mounting flange 25 to be affixed to the horizontal portion of the rear side rail 16. Lastly, the inside face 28 of the wheelhouse bracket 20 is formed to mate against the vertically oriented opposing side wall of the rear side rail 16 to allow the inside face 28 to be welded to the rear side rail 16. Accordingly, the wheelhouse bracket 20 is thoroughly integrated into the structure of the rear side rail 16. The wheelhouse bracket 20 is also formed to include a formed mounting flange 24 that is configured to mate against the wheelhouse 12 to allow the wheelhouse bracket 20 to be welded thereto.

The wheelhouse bracket 20 is also positioned in alignment with the location on the body where the shock absorber is mounted. The wheelhouse bracket 20 is formed with a horizontal shelf 22 that supports the mounting of the shock absorber (not shown). The integration of the wheelhouse bracket 20 into the structure of the rear side rails 16, as well as the orientation of the wheelhouse bracket 20 to be in alignment with the underbody cross member 17 and the C-pillar 19, provides substantial resistance to the forces exerted on the rear structure 15 by the suspension mechanism (not shown) while providing substantial torsional rigidity within the rear structure 15.

One skilled in the art will recognize that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In an automotive vehicle body having a wheelhouse structure, a longitudinally extending side frame rail, a transversely extending cross frame member connected to the side frame rail, a vertically oriented frame pillar, and a shock absorber forming part of a suspension mechanism of the automotive vehicle, an improved wheelhouse bracket comprising:

the wheelhouse bracket being affixed to an interior portion of the side frame rail to be integrated into the side frame rail.

2. The automotive vehicle body of claim 1 wherein the wheelhouse bracket is positioned in alignment with the cross frame member, the vertical frame pillar and the location where the shock absorber is mounted.

3. The automotive vehicle body of claim 2 wherein the wheelhouse bracket is formed with a mounting flange to permit a welding of the wheelhouse bracket to an interior surface of the side frame rail.

4. The automotive vehicle body of claim 3 wherein the mounting flange includes a first portion configured to be mated against a first generally vertically extending wall of the side frame rail and a second portion configured to be mated against a generally horizontally extending wall of the side frame rail.

5. The automotive vehicle body of claim 4 wherein the wheelhouse bracket further includes a front face portion that is configured to mate against a second generally vertically extending wall of the side frame rail opposite to said first wall.

6. The automotive vehicle body of claim 5 wherein the wheelhouse bracket further includes a generally horizontally oriented shelf for support of the shock absorber.

7. The automotive vehicle body of claim 6 wherein the wheelhouse bracket also includes a formed mounting flange configured to mate against the wheelhouse to facilitate welding the wheelhouse bracket thereto.

8. A wheelhouse reinforcement bracket for reinforcing a wheelhouse structure of an automotive vehicle having a longitudinally extending side frame rail, a transversely extending cross frame member, a generally vertically extending frame pillar and a shock absorber, comprising:
   a body portion configured to mate with the wheelhouse structure over the shock absorber, the body portion being configured for positioning in alignment with the cross frame member and with the frame pillar; and
   a first mounting flange portion that extends into said side frame rail to facilitate welding the wheelhouse reinforcement bracket to an interior surface of the side frame rail.

9. The wheelhouse reinforcement bracket of claim 8 wherein the first mounting flange includes a first portion configured to be mated against a first generally vertically extending wall of the side frame rail and a second portion configured to be mated against a generally horizontally extending wall of the side frame rail.

10. The wheelhouse reinforcement bracket of claim 9 wherein the wheelhouse bracket further comprises a front face portion that is configured to mate against a second generally vertically extending wall of the side frame rail opposite to said first wall.

11. The wheelhouse reinforcement bracket of claim 9 wherein the wheelhouse reinforcement bracket further comprises a generally horizontally oriented shelf for support of the shock absorber.

12. The automotive vehicle body of claim 9 wherein the wheelhouse reinforcement bracket also comprises a second mounting flange configured to mate against the wheelhouse to facilitate welding the wheelhouse reinforcement bracket thereto.

13. An automotive vehicle body comprising:
   first and second longitudinally extending side frame rails positioned on opposing transverse sides of the vehicle body;
   a transversely extending cross frame member interconnecting the first and second side frame rails;
   a transversely spaced pair of vertical frame pillars extending upwardly from said side frame rails to support a roof structure;
   a wheelhouse structure supported on opposing sides of the vehicle body by the side frame rails in general alignment with the cross frame member; and
   a wheelhouse reinforcement bracket mounted on each said wheelhouse structure and including a first mounting flange positioned within an interior portion of the corresponding said side frame rail so that the wheelhouse reinforcement bracket is affixed to the interior portion of the corresponding side frame rail.

14. The automotive vehicle body of claim 13 wherein the first mounting flange includes a first portion configured to be mated against a first generally vertically extending wall of the side frame rail.

15. The automotive vehicle body of claim 14 wherein the first mounting flange also includes a second portion configured to be mated against a generally horizontally extending wall of the side frame rail.

16. The automotive vehicle body of claim 15 wherein the wheelhouse reinforcement bracket further includes a front face portion that is configured to mate against a second generally vertically extending wall of the side frame rail opposite to said first wall.

17. The automotive vehicle body of claim 13 wherein the wheelhouse reinforcement bracket is positioned on the corresponding wheelhouse structure in alignment with the cross frame member and the frame pillar.

18. The automotive vehicle body of claim 17 wherein the wheelhouse reinforcement bracket further includes a generally horizontally oriented shelf for support of the shock absorber.

19. The automotive vehicle body of claim 17 wherein the wheelhouse reinforcement bracket also includes a second mounting flange configured to mate against the wheelhouse to facilitate welding the wheelhouse reinforcement bracket thereto.

* * * * *